(12) United States Patent
Nallapa (10) Patent No.: US 7,178,412 B2
(45) Date of Patent: Feb. 20, 2007

(54) ENCODER FAILURE DETECTION (75) Inventor: Venkatapathi Raju Nallapa, West Bloomfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 37 days.

(21) Appl. No.: 10/903,492

(22) Filed: Jul. 30, 2004

(65) Prior Publication Data
US 2006/0021450 A1    Feb. 2, 2006

(51) Int. Cl.
*G01L 3/02* (2006.01)

(52) U.S. Cl. .................................. 73/862.326
(58) Field of Classification Search ........... 73/862.326; 377/24; 371/25; 341/11, 9; 318/701
See application file for complete search history.

(56) References Cited

U.S. PATENT DOCUMENTS

| | | | |
|---|---|---|---|
| 4,461,015 A | 7/1984 | Kulhavy | 377/24 |
| 4,597,081 A | 6/1986 | Tassone | 371/25 |
| 4,796,005 A | 1/1989 | Ishida et al. | 341/11 |
| 4,882,529 A | 11/1989 | Kobari et al. | 318/602 |
| 5,058,145 A | 10/1991 | Hauck et al. | 377/17 |
| 5,128,536 A | 7/1992 | Higashi | 250/231.16 |
| 5,345,048 A | 9/1994 | Towey, Jr. | 187/116 |
| 5,357,181 A * | 10/1994 | Mutoh et al. | 318/139 |
| 5,407,024 A * | 4/1995 | Watson et al. | 180/248 |
| 5,650,779 A * | 7/1997 | Sugden | 341/9 |
| 5,723,858 A * | 3/1998 | Sugden | 250/231.13 |
| 6,246,343 B1 | 6/2001 | Deng et al. | 341/11 |
| 2004/0008002 A1* | 1/2004 | Kamio et al. | 318/701 |

FOREIGN PATENT DOCUMENTS

JP    2003-299385    10/2003

* cited by examiner

*Primary Examiner*—Jewel V. Thompson
(74) *Attorney, Agent, or Firm*—Seed IP Law Group PLLC (57) ABSTRACT

An encoder failure detector system and method for detecting failure of an encoder at near-zero rotational speeds. For example, in one embodiment a failure is indicated if a torque command exceeds a selected threshold for a selected period of time and no movement of a rotor is detected during the selected period of time.

34 Claims, 5 Drawing Sheets

ENCODER FAILURE DETECTION

BACKGROUND OF THE INVENTION

1. Field of the Invention

This disclosure generally relates to encoders, and more particularly to detection of failures in increment encoders.

2. Description of the Related Art

Increment encoders are used to determine the rotational velocity, acceleration, direction and/or the position of a rotating object in a machine, such as a shaft of an electric motor or generator. This information can be used to control the machine. For example, in electric/hybrid motor vehicles information from an encoder is typically provided to a control unit that can use the information together with other information to control the motor vehicle.

A failed encoder can lead to abnormal behaviors of a machine. Thus, methods for detecting and responding to the failure of an encoder have been developed. For example, a control unit can be programmed to generate appropriate control signals in response to an indication that an encoder has failed, such as control signals shutting down a machine, such as a motor vehicle.

Conventional methods of detecting encoder failure are directed to detecting failure above a certain threshold rotational speed because failures at rotational speeds close to zero are considered unlikely and/or are difficult to detect due to challenges in measuring low rotational speeds. The threshold minimum rotational speed will vary based on the characteristics of a particular machine. Conventional error detection schemes also are likely to produce many inaccurate indications of encoder failure at rotational speeds near zero, which also is undesirable.

Thus, architectures and, or methods for detecting encoder failure at rotational speeds near zero while minimizing false indications of encoder failure are highly desirable.

BRIEF SUMMARY OF THE INVENTION

In one aspect, a system for controlling a machine comprises: an encoder to generate pulses in response to a rotational movement of a rotating component of the machine; speed sensing circuitry coupled to the encoder to generate a signal corresponding to a sensed speed; torque control circuitry to generate a control signal to control a torque of a rotating component; and encoder failure detection circuitry, wherein the encoder failure detection circuitry is configured to: selectively initiate a failure detection cycle; monitor a level of the torque control signal during the failure detection cycle; count a number of pulses generated by the encoder during the failure detection cycle; terminate the failure detection cycle and generate a signal indicating no failure, if the monitored level of the torque control signal during the failure detection cycle is within a first threshold range; terminate the failure detection cycle and generate a signal indicating no failure, if the number of pulses counted during the failure detection cycle exceeds a threshold pulse count; and terminate the failure detection cycle and generate a signal indicating a failure, if a selected period of time has elapsed since the failure detection cycle was initiated and the failure detection cycle was not previously terminated.

In another aspect, a machine comprises: a rotatable component; and a control system, wherein the control system comprises: an encoder to generate a signal corresponding to a rotational movement of the rotatable component and coupled to the rotatable component; a speed sensing circuit coupled to the encoder to generate a signal corresponding to a sensed speed of the rotatable component; a torque control circuit to generate a control signal to control a torque of the rotatable component; and an encoder failure detection circuit to monitor the signal corresponding to a rotational movement of the rotatable component and the control signal to control a torque of the rotatable component, wherein the encoder failure detection circuitry is configured to generate a signal corresponding to a failure of the encoder if: the signal corresponding to a sensed speed is below a first threshold value; the signal to control a torque continuously exceeds a second threshold value for a selected period of time; and the signal corresponding to a rotational movement of the rotatable component does not indicate a movement during the selected period of time.

In another aspect, a method of detecting an encoder failure in a machine comprises: monitoring a torque control signal during a selected time period; counting a number of pulses in an encoder channel output during the selected time period; and setting a variable to indicate no failure if the monitoring of a torque control signal indicates the torque control signal is within a first threshold range at any time during the selected time period.

In another aspect, a method of detecting an encoder failure in a machine comprises: selectively initiating a test cycle; monitoring a level of a control signal during the test cycle; counting a number of pulses of an encoder channel during the test cycle; terminating the test cycle and indicating no failure, if the monitored level of the control signal is within a first threshold range; terminating the test cycle and indicating no failure, if the number of pulses counted during the test cycle exceeds a threshold pulse count; and terminating the test cycle and indicating a failure, if a selected period of time has elapsed since the test cycle was initiated and the test cycle was not previously terminated.

In another aspect, a control system comprises: means for detecting movement of a rotatable component; means for controlling movement of the rotatable component; and means for detecting a failure of the means for detecting movement of a rotatable component, coupled to the means for detecting movement of a rotatable component and to the means for controlling movement of the rotatable component, wherein the means for detecting a failure of the means for detecting movement of a rotatable component monitors the means for controlling movement of the rotatable component for a selected period of time.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments. However, one skilled in the art will understand that the present systems and methods may be practiced without these details. In other instances, well-known structures associated with encoders, rotors, motors, controllers and/or circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
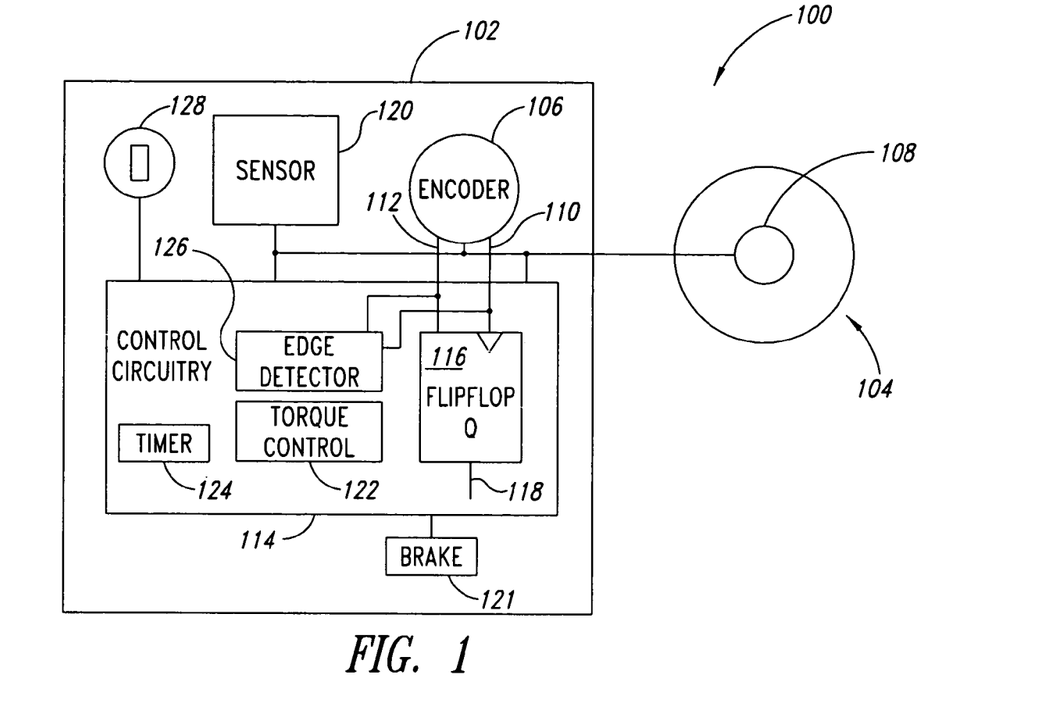
FIG. 1 is a schematic view of a portion of a control system incorporating an encoder and an electric machine according to one illustrated embodiment.
Figure 2:
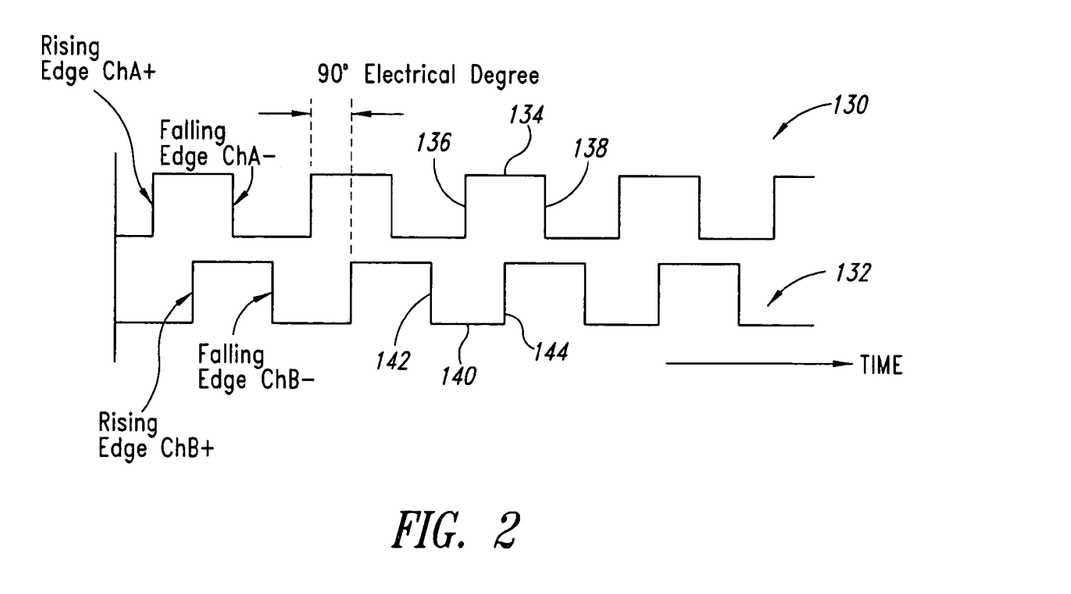
FIG. 2 is a timing diagram illustrating operation of the embodiment of FIG. 1.

FIGS. 1 and 2 illustrate a system 100 having a control system 102 coupled to a machine 104. The control system 102 has a two-channel increment encoder 106 for sensing a rotational speed or position of a shaft 108 in the machine 104. The increment encoder 106 has two quadrant outputs 110, 112, referred to herein as channel A 110 and channel B 112. After reviewing the specification, one of skill in the art will recognize that an encoder having one or more output channels and/or multiple encoders may be employed. The output channels A 110 and B 112 are coupled to control circuitry 114, which may comprise, for example, a D-type edge-triggered flip-flop 116. After reviewing the specification, one of skill in the art will recognize that any suitable method or device may be employed by the control circuitry 114 for receiving signals from the output channels A 110 and B 112. The illustrated flip-flop 116 has an output Q 118. The control system 102 has a sensor 120 for sensing conditions of the machine 104, such as a temperature, a control signal, a feedback signal or a control setting. The sensor 120 may detect, for example, whether a parking brake 121 is set or a setting of a torque control 122. The control circuitry 114 also comprises a timer 124 and an edge detector 126 that is coupled to the encoder 106. The control system 102 also comprises a keyed switch 128.

FIG. 2 is a timing diagram illustrating a pulse signal 130 of channel A 110 and a pulse signal 132 of channel B 112 of the increment encoder 106. These pulse signals 130, 132 are usually phase-shifted from one another by ninety degrees. Pulse signal 130 of channel A 110 comprises pulses 134, each of which has a rising edge 136 and a falling edge 138. Similarly, pulse signal 132 of channel B 112 comprises pulses 140, each of which has a rising edge 142 and a falling edge 144.

The number of pulses in a channel (for example, pulses 134 of pulse signal 130 of channel A 110) corresponds to a rotational angle. The output 118 of the flip-flop 116 corresponds to a direction of rotation. At rotational speeds in a low speed range, the rotational speed of the shaft 108 is generally determined by measuring the time elapsed for a fixed number of pulses to be generated. At higher rotational speeds, the rotational speed is generally determined by counting the number of pulses in a fixed time period. See U.S. Pat. No. 6,246,343, which is incorporated in its entirety herein by reference. In conventional systems, encoder failure detection schemes follow the speed detection scheme used for a given speed range.

Rotational speeds below a certain minimum, however, cannot be accurately measured by conventional systems unless expensive, specialized devices are employed. In addition, encoder failure at low rotational speeds was previously thought to be unlikely with a high occurrence of false indications of failure expected. Thus, encoder failure detection schemes are disabled at rotational speeds below a minimum rotational speed in conventional systems. The particular minimum rotational speed is application specific and depends on the type of machine and the rotational speeds at which it operates. For example, when the rotational speed of a shaft or rotor falls below 210 revolutions per minute in certain electric motor vehicles, encoder failure detection schemes are disabled in conventional systems. Thus, conventional encoder failure detection schemes do not detect a missing or disconnected encoder or an encoder that malfunctions below the minimum rotational speed.

Figure 3:
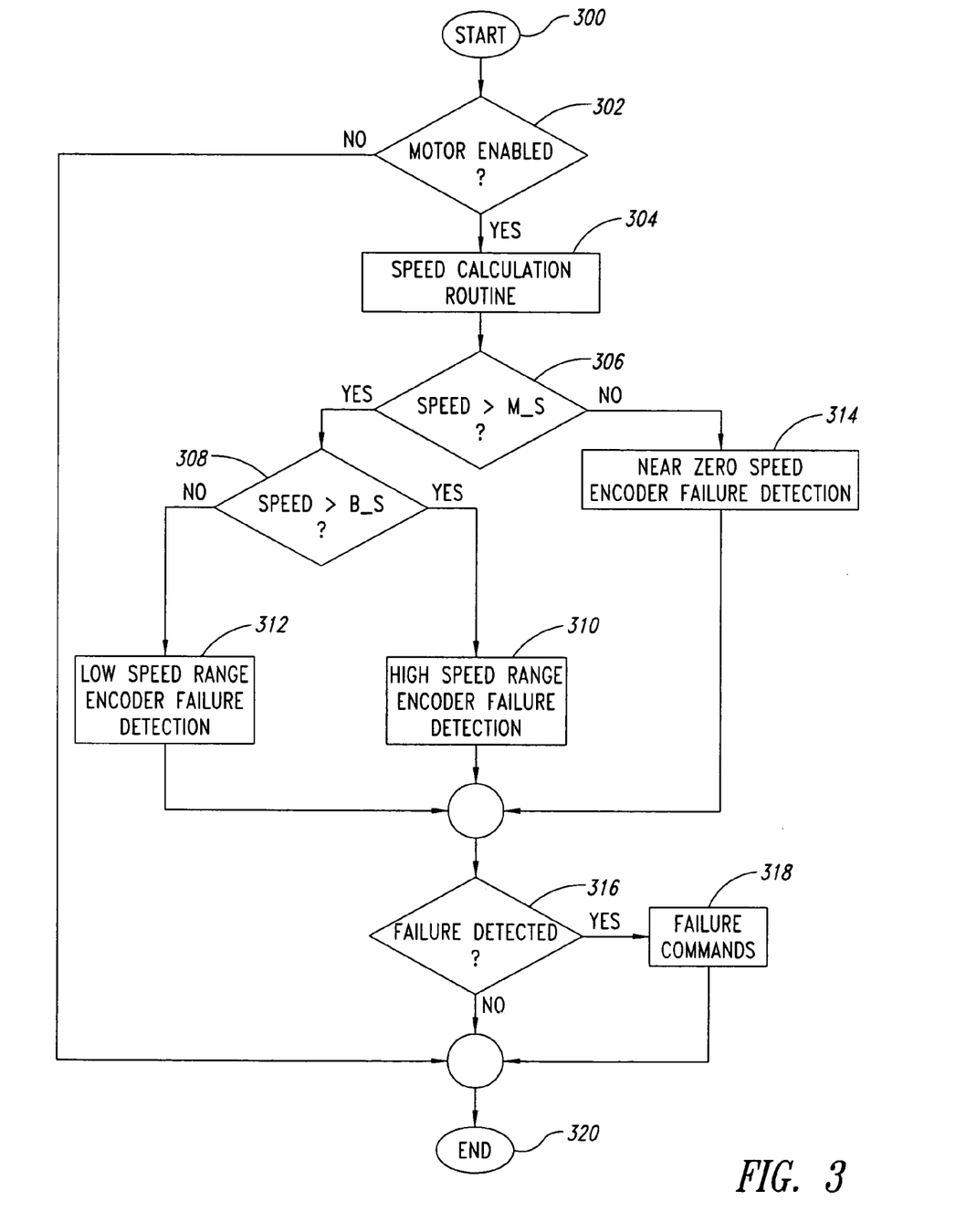
FIG. 3 is a flow chart illustrating operation of an embodiment of an encoder control system.

FIG. 3 is a flow diagram for the operation of an increment encoder in a system 100, such as the embodiment illustrated FIG. 1. The system 100 starts at 300. At 302, the system 100 determines whether the rotating component in a machine, such as the shaft 108 of machine 104 in FIG. 1, is enabled. If it is determined that the rotating component of the machine is enabled, the system 100 proceeds to 304. If it is determined that the rotating component of the machine is not enabled, the system 100 proceeds to 320.

At 304, the system 100 calculates the speed of a rotating component or determines that it is unable to calculate a speed of a rotating component. At 306, the system 100 compares the result of the speed calculation to a predetermined minimum speed. As discussed above, the minimum speed is selected based on characteristics of the system 100 and/or the intended use of the system 100. If the speed calculated at 304 is greater than or equal to the minimum speed, the system 100 proceeds from 306 to 308.

At 308, the system 100 determines whether the speed calculated at 304 is above a boundary speed. The boundary speed is selected based on characteristics and/or the intended use of the system 100. If the speed calculated at 304 is greater than the boundary speed, the system proceeds from 308 to 310, where a high speed range encoder failure detection subroutine is called. After the subroutine is executed, the system 100 proceeds from 310 to 316.

If the speed calculated at 304 is less than the boundary speed, the system proceeds from 308 to 312, where a low speed range encoder failure detection subroutine is called. After the subroutine is executed, the system 100 proceeds from 312 to 316.

If the speed calculated at 304 is less than the minimum speed or the system 100 was unable to calculate a speed at 304, the system 100 proceeds from 306 to 314, where a near-zero speed encoder failure detection subroutine is called. After the subroutine is executed, the system proceeds from 314 to 316.

At 316, the system 100 determines whether an encoder failure has been detected by the appropriate subroutine. If an encoder failure has been detected, the system 100 proceeds from 316 to 318, where appropriate control signals are generated based on the indication of an encoder failure. The system then proceeds to 320. If an encoder failure has not been detected, the system 100 proceeds from 316 to 320. At 320, the system 100 may perform other functions, it may stop or it may return to 300. After reviewing the specification, one of skill in the art will recognize that embodiments of the system 100 may perform other acts not shown in FIG. 3, may not all perform all of the acts shown in FIG. 3, or may perform the acts of FIG. 3 in a different order. For example, the system 100 may clear an encoder failure if a switch (such as keyed switch 128 of FIG. 1) is toggled.

Figure 4A:
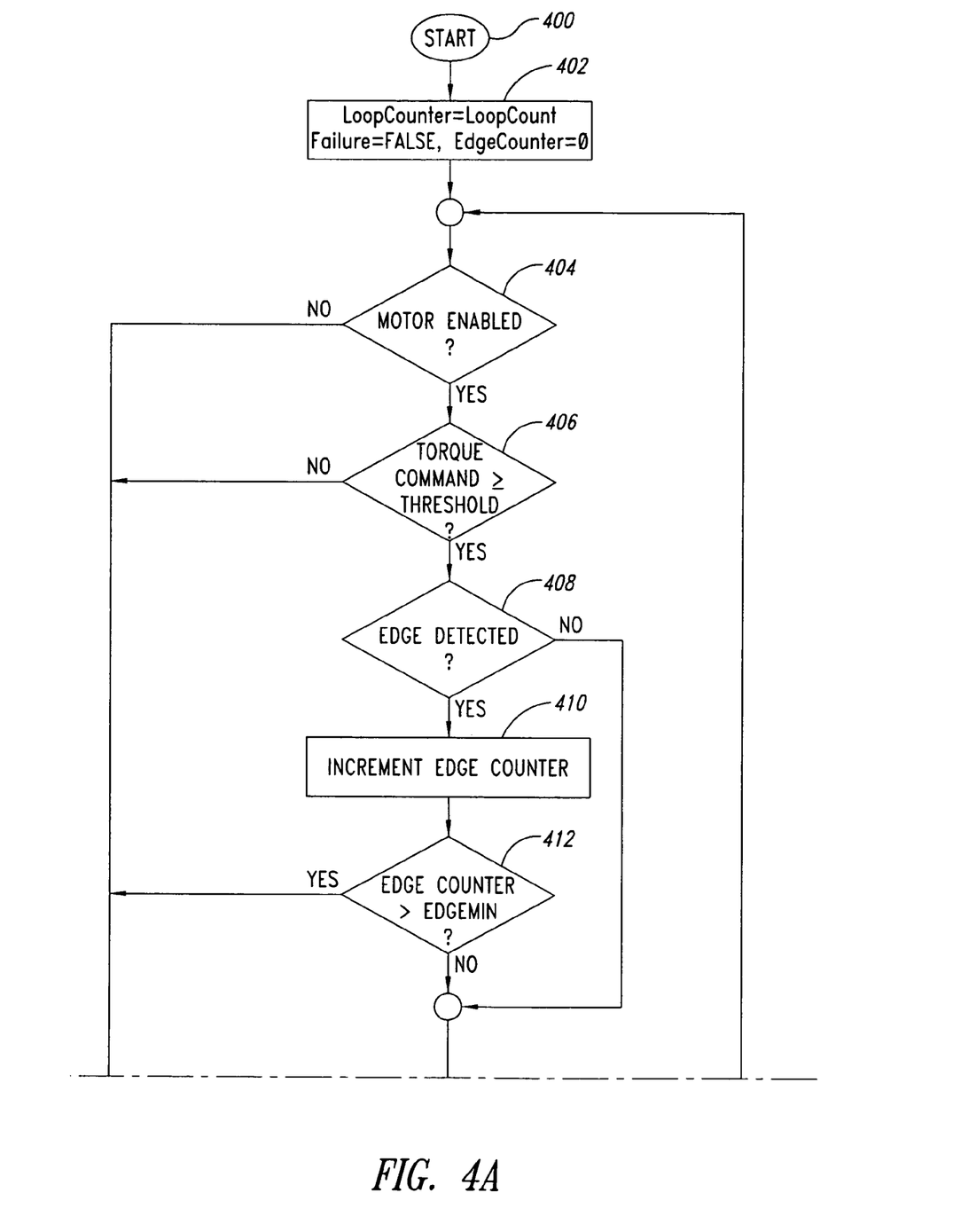
FIGS. 4a and 4b are a flow chart illustrating operation of an embodiment of a near zero speed encoder failure detection subroutine.
Figure 4B:
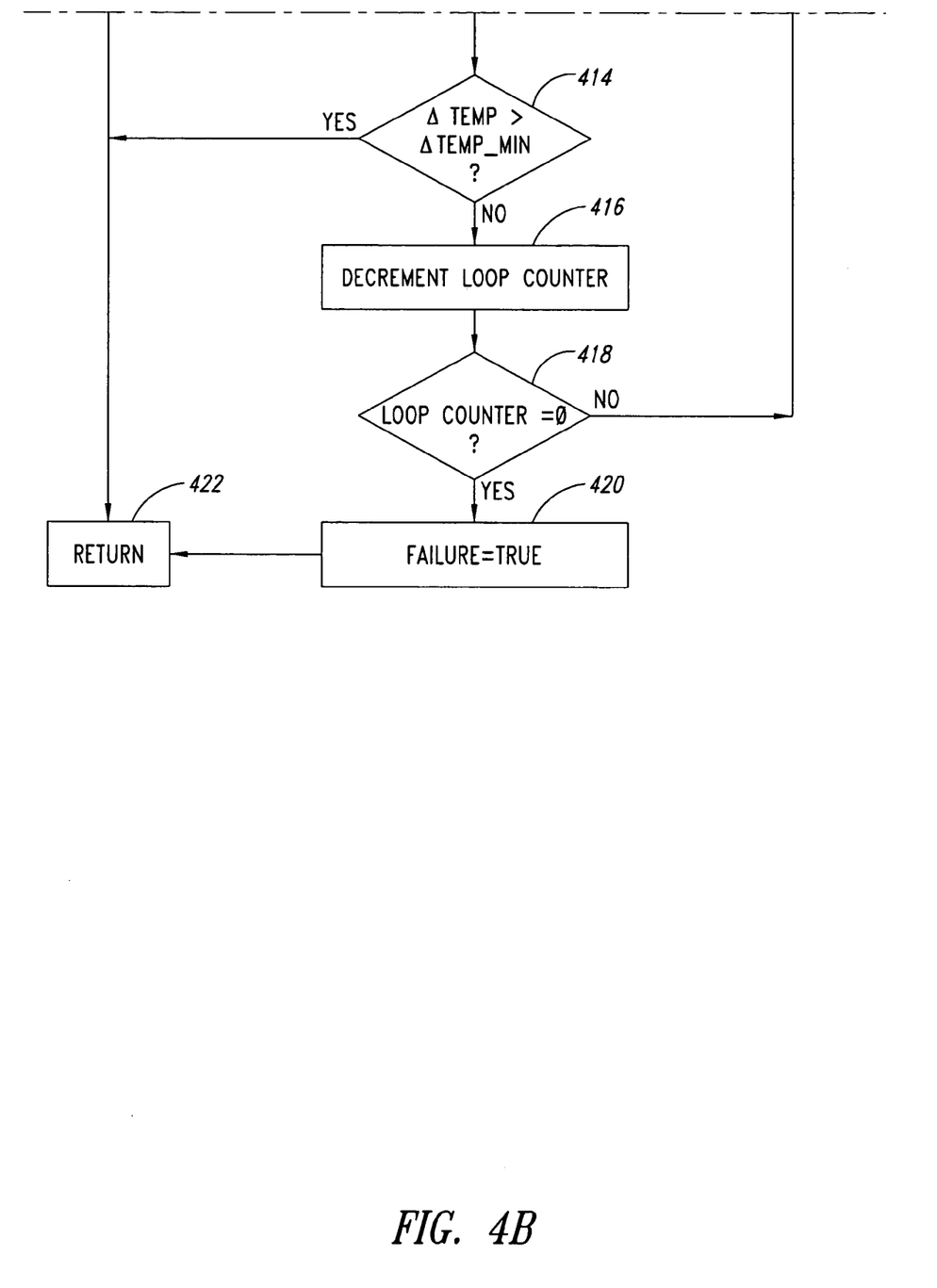

FIGS. 4a and 4b are a flow diagram illustrating an embodiment of a near zero speed encoder failure detection subroutine. The subroutine can be employed to detect a failed or missing encoder, such as the encoder 106 of FIG. 1, at low rotational speeds, such as rotational speeds below a minimum rotational speed and when the rotating component, such as shaft 108 of FIG. 1, has no rotational speed or no rotational speed has been measured.

At 400 the near-zero speed encoder failure detection subroutine starts. Initialization occurs at 402, where a loop counter value is set for a testing loop; a failure indicator is set to FALSE and an edge counter value is set to zero. The loop counter value is a matter of design choice for a particular machine and use and is adjustable in an exemplary embodiment. For example, in a motor vehicle the value in an embodiment might be set high enough that the subroutine will run for half a minute or longer so as to minimize false indications of a failed encoder. After reviewing the specification, one of skill in the art will recognize that the loop counter can be implemented in software or using hardware, such as the timer 121 of FIG. 1, or some combination of software and hardware.

The subroutine proceeds from 402 to 404. At 404, the subroutine checks to see if the motor is enabled. If the motor is not enabled, the subroutine goes to 422 and returns an indication that no failure has occurred. If the motor is enabled, the subroutine proceeds to 406.

At 406 the subroutine checks whether a torque command is set above or equal to a certain threshold torque value. If the torque command is set below the threshold torque value, the subroutine goes to 422 and returns an indication that no failure has occurred. If the torque command is set above or equal to the threshold torque value, the subroutine proceeds to 408. The threshold torque value is a matter of design choice for a particular machine and use. In an exemplary embodiment for a motor vehicle, the threshold torque value is selected so as to minimize false indications of an encoder failure.

Common conditions that could result in a false indication of encoder failure include a motor vehicle attempting to climb a curb or maintain a position on a hill. A rotor locked during testing also can produce a false indication of an encoder failure. Experiments could be conducted to determine at what value a torque command could be expected to result in a detectable rotational movement even if the vehicle were operating in a condition likely to produce limited rotational movement. This would indicate a threshold torque value that should produce rotational movement that would be detected by a functioning encoder. In other applications where detecting an encoder failure at low speed might be more critical than avoiding false indications of an encoder failure, a different threshold torque value could be selected. In an exemplary embodiment, the threshold torque value could be adjusted so as to better match the characteristics of the machine and the anticipated use of the machine. After reviewing the specification, one of skill in the art will recognize that the subroutine can determine whether a torque command exceeds a threshold value in a number of ways. For example, the absolute value of the torque command could be compared to a threshold value or the value of the torque command could be compared to a threshold torque range.

After reviewing the specification, one of skill in the art will recognize that the loop counter value and the threshold torque value can be selected together so as to minimize false indications of an encoder failure. For example, one embodiment might set an initial loop counter value corresponding to a loop duration of 500 milliseconds and might set a threshold torque value corresponding to a motor torque of 120 Newton-meters. Another embodiment might set an initial loop counter value corresponding to a loop duration of 60 seconds and might set a threshold torque value corresponding to a motor torque of 200 Newton-meters.

At 408 the subroutine checks to see whether an encoder channel edge has been detected. When a torque command is applied, a functioning encoder would be expected to produce pulses at a channel output under normal conditions. If an encoder channel edge has not been detected at 408, the subroutine proceeds from 408 to 414. If encoder channel edge has been detected at 408, the subroutine proceeds from 408 to 410 where the value of the edge counter is incremented. The subroutine then checks at 412 to see whether the value of the edge counter exceeds a threshold edge count value. If the value of the edge counter exceeds the threshold edge count value at 412, the subroutine proceeds from 412 to 422 where it returns an indication that no failure has occurred. If the value of the edge counter does not exceed the threshold edge count value at 412, the subroutine continues to 414. The threshold edge count value is a matter of design choice for a particular machine and use. For example, in an exemplary embodiment for a motor vehicle, the threshold edge count value might be 1. In an exemplary embodiment, the threshold edge count value is adjustable. One of skill in the art would recognize after reviewing the specification that for a threshold edge count value of 1, the flow diagram of FIG. 4 could be simplified to omit acts 410 and 412. One of skill in the art also would recognize after reviewing the specification that the subroutine could check for pulses instead of edges.

At 414 the subroutine checks whether a change in temperature has exceeded a selected threshold value. If the change in temperature exceeds the selected threshold value at 414, the subroutine proceeds from 414 to 422 where it returns an indication that no failure has occurred. If the change in temperature does not exceed the selected threshold value at 414, the subroutine proceeds from 414 to 416. The threshold value for the change in temperature is a matter of design choice for a particular machine and use. For example, in a motor vehicle, a change in temperature can be expected if a rotor is locked or the vehicle is on a hill, and thus no or a small number of edge detections would not necessarily indicate a failure of an encoder. In an exemplary embodiment, the threshold value for a change in temperature is adjustable. After reviewing the specification, one of skill in the art would recognize that a temperature, rather than a change in temperature, could be compared to a threshold value. After reviewing the specification, one of skill in the art also would recognize a change in temperature could be compared to a threshold range rather than a threshold value.

At 416, the subroutine decrements the loop counter value and proceeds to 418. At 418, the subroutine checks whether the loop counter value is zero. If the loop counter value is not zero at 418, the subroutine returns to 404. If the loop counter value is zero at 418, the subroutine proceeds to 420 where it sets the failure indicator to TRUE. The subroutine then proceeds to 422, where it returns the value of the failure indicator, and any other desired variables, such as the number of edges detected.

After reviewing the specification one of skill in the art will recognize that embodiments of a near-zero speed encoder failure subroutine may perform other acts not shown in FIG. 4, may not all perform all of the acts shown in FIG. 4, or may perform the acts of FIG. 4 in a different order. For example, the subroutine of FIG. 4 may be modified to determine whether a parking brake, such as brake 121 of FIG. 1, is set and indicate that no failure has occurred if the parking brake is set.

Figure 5:
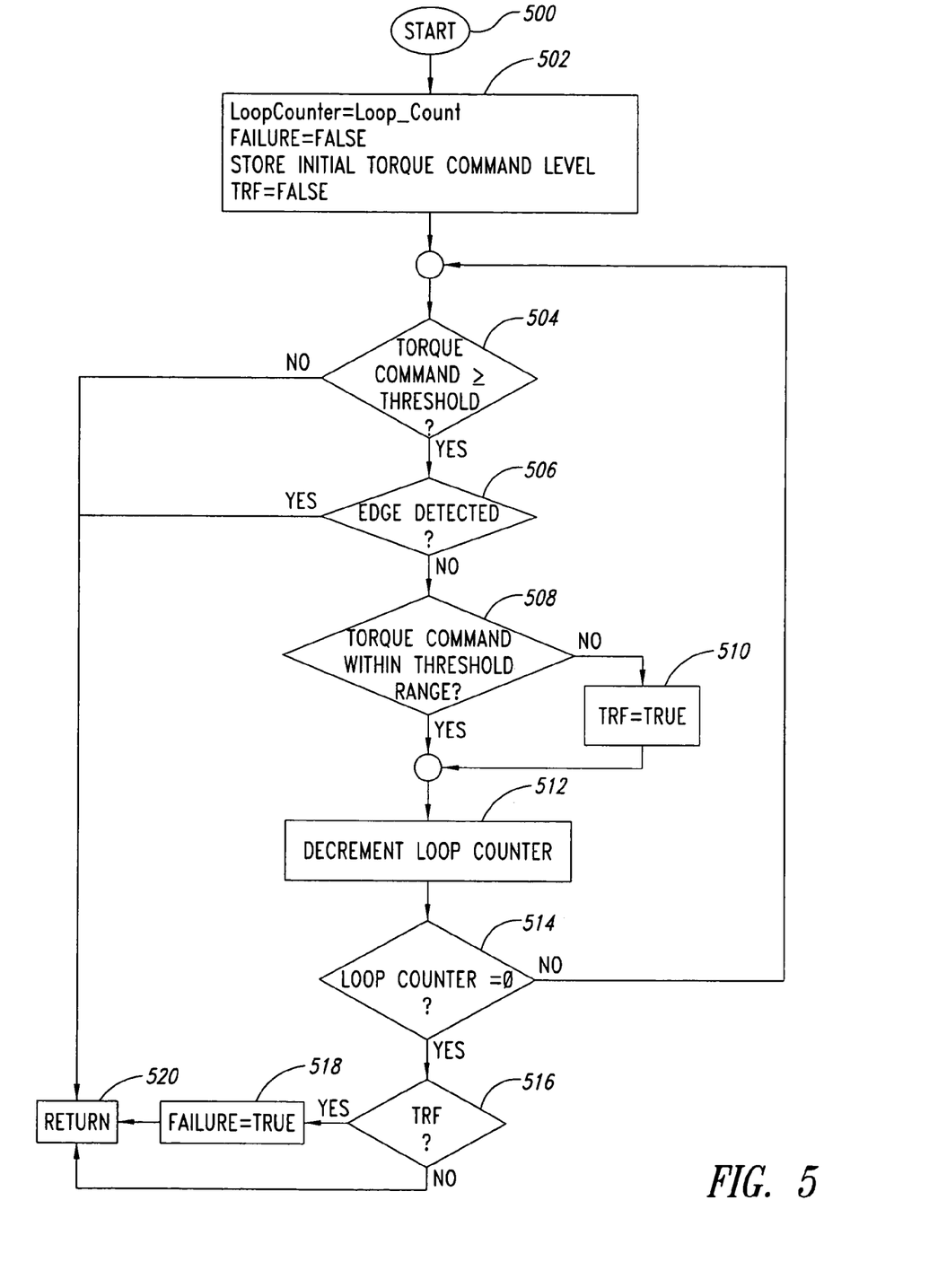
FIG. 5 is a flow chart illustrating operation of another embodiment of a near zero speed encoder failure detection subroutine.

FIG. 5 is a flow diagram illustrating an embodiment of a near zero speed encoder failure detection subroutine. The subroutine can be employed to detect a failed or missing encoder, such as the encoder 106 of FIG. 1, at low rotational speeds, such as rotational speeds below a minimum rotational speed and when the rotating component, such as shaft 108 of FIG. 1, has no rotational speed or no rotational speed has been measured. The operation illustrated in FIG. 5 is useful in avoiding false indications of an encoder failure when a motor vehicle is maintaining position on a hill.

At 500 the near-zero speed encoder failure detection subroutine starts. Initialization occurs at 502, where a loop counter value is set for a testing loop; a failure indicator is set to FALSE, an initial torque command value is stored and a torque range flag is set to FALSE. The loop counter value is a matter of design choice for a particular machine and use and is adjustable in an exemplary embodiment. The subroutine proceeds from 502 to 504.

At 504 the subroutine checks whether a torque command is set above or equal to a certain threshold torque value. If the torque command is set below the threshold torque value, the subroutine goes to 520 and returns an indication that no failure has occurred. If the torque command is set above or equal to the threshold torque value, the subroutine proceeds to 506. The threshold torque value is a matter of design choice for a particular machine and use. In an exemplary embodiment for a motor vehicle, the threshold torque value is selected so as to minimize false indications of an encoder failure.

At 506 the subroutine checks to see whether an encoder channel edge has been detected. When a torque command is applied, a functioning encoder would be expected to produce pulses at a channel output under normal conditions. If an encoder channel edge has not been detected at 506, the subroutine proceeds from 506 to 508. If encoder channel edge has been detected at 506, the subroutine proceeds from 506 to 520 and returns an indication that no failure has occurred.

At 508, the subroutine determines whether the torque command is set within a selected threshold range of the stored initial torque command value. If the torque command is set within the selected threshold range of the stored initial torque command value, the subroutine proceeds from 508 to 512. If the torque command is not within the selected threshold range of the stored initial torque command value, the subroutine proceeds from 508 to 510. At 510, the torque range flag is set to TRUE and the subroutine proceeds from 510 to 512.

At 512, the subroutine decrements the loop counter value and proceeds to 514. At 514, the subroutine checks whether the loop counter value is zero. If the loop counter value is not zero at 514, the subroutine returns to 504. If the loop counter value is zero at 514, the subroutine proceeds to 516.

At 516, the subroutine determines whether the torque range flag is TRUE. If the torque range flag is TRUE at 516, the subroutine proceeds to 518, where it sets the failure indicator to TRUE. The subroutine then proceeds from 518 to 520. If the torque range flag is FALSE at 516, the subroutine proceeds from 516 to 520.

At 520, the subroutine returns the value of the failure indicator, and any other desired variables, such as the stored initial torque value.

After reviewing the specification one of skill in the art will recognize that embodiments of a near-zero speed encoder failure subroutine may perform other acts not shown in FIG. 5, may not all perform all of the acts shown in FIG. 5, or may perform the acts of FIG. 5 in a different order. For example, the subroutine of FIG. 5 may be modified to determine whether a brake is set and to indicate that no failure has occurred if the brake is set.

Although specific embodiments of and examples for a control system and method are described herein for illustrative purposes, various equivalent modifications can be made without departing from the spirit and scope of the invention, as will be recognized by those skilled in the relevant art. The teachings provided herein can be applied to other systems with increment encoders, not necessarily the machines and motor vehicles described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. Pat. No. 6,246,343 are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all control systems incorporating increment encoders. Accordingly, the invention is not limited by the disclosure, but instead its scope is to be determined entirely by the following claims.

The invention claimed is:

1. A machine comprising:
a rotatable component; and
a control system, the control system comprising:
an encoder to generate a signal corresponding to a rotational movement of the rotatable component and coupled to the rotatable component;
speed sensing circuitry coupled to the encoder to generate a signal corresponding to a sensed speed of the rotatable component;
torque control circuitry to generate a control signal to control a torque of the rotatable component; and
encoder failure detection circuitry to monitor the signal corresponding to a rotational movement of the rotatable component and the control signal to control a torque of the rotatable component, wherein the encoder failure detection circuitry is configured to generate a signal corresponding to a failure of the encoder if:

the signal corresponding to a sensed speed is below a first threshold value;

the signal to control a torque of the rotatable component continuously exceeds a second threshold value for a selected period of time; and the signal corresponding to a rotational movement of the rotatable component does not indicate a movement during the selected period of time.

2. The machine of claim 1, wherein the encoder is configured to generate a pulse in response to a movement of the rotatable component.

3. A control system for controlling a rotating component of a machine, the control system comprising:

an encoder to generate pulses in response to a rotational movement of a rotating component;

speed sensing circuitry coupled to the encoder to generate a signal corresponding to a sensed speed;

torque control circuitry to generate a control signal to control a torque of the rotating component; and encoder failure detection circuitry, wherein the encoder failure detection circuitry is configured to:

selectively initiate a failure detection cycle;

monitor a level of the torque control signal during the failure detection cycle;

count a number of pulses generated by the encoder during the failure detection cycle;

terminate the failure detection cycle and generate a signal indicating no failure, if the monitored level of the torque control signal during the failure detection cycle is within a first threshold range;

terminate the failure detection cycle and generate a signal indicating no failure, if the number of pulses counted during the failure detection cycle exceeds a threshold pulse count; and terminate the failure detection cycle and generate a signal indicating a failure, if a selected period of time has elapsed since the failure detection cycle was initiated and the failure detection cycle was not previously terminated.

4. The control system of claim 3, further comprising a sensor to generate an output signal and wherein the encoder failure detection circuitry is further configured to:

monitor a level of the sensor output signal during the failure detection cycle; and terminate the failure detection cycle and generate a signal indicating no failure, if the level of the sensor output signal is within a second threshold range during the failure detection cycle.

5. The control system of claim 4, wherein the sensor monitors a temperature.

6. The control system of claim 3, wherein the encoder failure detection circuitry is further configured to:

monitor a brake during the failure detection cycle; and terminate the failure detection cycle and generate a signal indicating no failure, if the brake is engaged.

7. The control system of claim 3, wherein the selected period of time has a duration of at least ten seconds.

8. The control system of claim 3, wherein the encoder failure detection circuitry is configured to selectively initiate the failure detection cycle if the signal corresponding to a sensed speed is within a threshold speed range.

9. The control system of claim 3, wherein the encoder failure detection circuitry is configured to selectively initiate the failure detection cycle if the signal corresponding to a sensed speed is undefined.

10. The control system of claim 3, wherein the encoder failure detection circuitry is configured to selectively initiate an alternative encoder failure detection cycle.

11. A method of detecting a failure of an increment encoder in a machine, the method comprising:

monitoring a torque control signal during a selected time period;

counting a number of pulses in an encoder channel output during the selected time period;

setting a variable to indicate no failure if the monitoring of a torque control signal indicates the torque control signal is within a first threshold range at any time during the selected time period; and monitoring a signal corresponding to a condition of the machine during the selected time period and setting the variable to indicate no failure, if the signal corresponding to a condition of the machine exceeds a first threshold level.

12. The method of claim 11 wherein the signal corresponding to a condition of the machine corresponds to a temperature.

13. The method of claim 11 wherein the signal corresponding to a condition of the machine corresponds to a temperature change.

14. The method of claim 11, wherein the signal corresponding to a condition of the machine corresponds to a brake setting.

15. The method of claim 11 wherein counting a number of pulses in an encoder channel output comprises counting a number of pulse edges.

16. A method of detecting a failure of an increment encoder in a machine, the method comprising:

monitoring a torque control signal during a selected time period;

counting a number of pulses in an encoder channel output during the selected time period; and setting a variable to indicate no failure if the monitoring of a torque control signal indicates the torque control signal is within a first threshold range at any time during the selected time period; and setting the variable to indicate no failure if the number of pulses counted during the selected time period exceeds zero.

17. A method of detecting a failure of an increment encoder in a machine, the method comprising:

monitoring a torque control signal during a selected time period;

counting a number of pulses in an encoder channel output during the selected time period; and setting a variable to indicate no failure if the monitoring of a torque control signal indicates the torque control signal is within a first threshold range at any time during the selected time period; and setting the variable to indicate a failure, if the monitoring of a torque control signal indicates the torque control signal remained outside the first threshold range throughout the selected time period and no pulses were counted during the selected time period.

18. A method of detecting a failure of an increment encoder in a machine, the method comprising:

monitoring a torque control signal during a selected time period;

counting a number of pulses in an encoder channel output during the selected time period; and setting a variable to indicate no failure if the monitoring of a torque control signal indicates the torque control signal is within a first threshold range at any time during the selected time period; and counting a number of pulses in another encoder output channel during the selected time period.

19. A method of detecting a failure of an encoder in an electric vehicle, the method comprising:

selectively initiating a test cycle;
monitoring a level of a control signal during the test cycle;
counting a number of pulses of an encoder channel during the test cycle;
terminating the test cycle and indicating no failure, if the monitored level of the control signal is within a first threshold range;
terminating the test cycle and indicating no failure, if the number of pulses counted during the test cycle exceeds a threshold pulse count; and
terminating the test cycle and indicating a failure, if a selected period of time has elapsed since the test cycle was initiated and the test cycle was not previously terminated.

20. The method of claim 19, further comprising:
monitoring an output level of a sensor during the test cycle; and
terminating the test cycle and indicating no failure, if the output level of the sensor is within a second threshold range.

21. The method of claim 20, wherein the sensor monitors a temperature.

22. The method of claim 19, wherein the control signal is a torque command.

23. The method of claim 19, further comprising:
monitoring a brake during the test cycle; and
terminating the test cycle and indicating no failure, if the brake is engaged.

24. The method of claim 19 wherein the selected period of time has a duration of at least ten seconds.

25. The method of claim 19, further comprising selectively initiating an alternative test cycle.

26. The method of claim 19, further comprising generating control signals in response to an indication of a failure.

27. A control system comprising:
means for detecting movement of a rotatable component;
means for controlling movement of the rotatable component;
means for detecting a failure of the means for detecting movement of a rotatable component, coupled to the means for detecting movement of a rotatable component and to the means for controlling movement of the rotatable component, wherein the means for detecting a failure of the means for detecting movement of a rotatable component monitors the means for controlling movement of the rotatable component for a selected period of time; and
means for detecting a condition related to the rotatable component wherein the means for detecting a failure of the means for detecting movement of a rotatable component is coupled to the means for detecting a condition related to the rotatable component and is configured to generate a signal indicating the means for detecting movement of a rotatable component is functioning properly if the condition is detected.

28. The control system of claim 27 wherein the means for controlling movement of the rotatable component comprises circuitry for generating a torque command and the means for detecting a failure of the means for detecting movement of a rotatable component is configured to monitor a generated torque command and to generate a signal indicating the means for detecting movement of a rotatable component is functioning properly if the monitored torque command is within a selected range at any time during the selected period of time.

29. The control system of claim 28 wherein the means for detecting a failure of the means for detecting movement of a rotatable component is configured to generate a signal indicating the means for detecting movement of a rotatable component is functioning properly if the means for detecting movement of a rotatable component detects movement of the rotatable component during the selected period of time.

30. The control system of claim 29 wherein the means for detecting a failure of the means for detecting movement of a rotatable component is configured to generate a signal indicating the means for detecting movement of a rotatable component has failed if:
the means for detecting movement of a rotatable component indicates no movement has occurred during the selected period of time; and
the monitored torque command remains outside the selected range for the selected period of time.

31. The control system of claim 27 wherein the means for controlling movement of the rotatable component comprises a brake.

32. The control system of claim 27 wherein the means for detecting movement of the rotatable component is configured to generate pulses in response to movements of the rotatable component.

33. A computer-readable medium storing instructions for causing a control system to facilitate detection of a failed increment encoder in an electric vehicle by:
selectively initiating a test cycle;
monitoring a level of a control signal during the test cycle;
counting a number of pulses of an encoder channel during the test cycle;
terminating the test cycle and indicating no failure, if the monitored level of the control signal is within a first threshold range;
terminating the test cycle and indicating no failure, if the number of pulses counted during the test cycle exceeds a threshold pulse count; and
terminating the test cycle and indicating a failure, if a selected period of time has elapsed since the test cycle was initiated and the test cycle was not previously terminated.

34. A method of detecting a failure of an encoder in a machine, the method comprising:
selectively initiating a test cycle;
monitoring a level of a control signal during the test cycle;
counting a number of pulses of an encoder channel during the test cycle;
terminating the test cycle and indicating no failure, if the monitored level of the control signal is within a first threshold range;
terminating the test cycle and indicating no failure, if the number of pulses counted during the test cycle exceeds a threshold pulse count;
terminating the test cycle and indicating no failure, if a selected period of time has elapsed since the test cycle was initiated, the test cycle was not previously terminated and the monitored level of the control signal remained within a second threshold range during the test cycle; and
terminating the test cycle and indicating a failure, if the selected period of time has elapsed since the test cycle was initiated, the test cycle was not previously terminated and the monitored level of the control signal did not remain within the second threshold range during the test cycle.

* * * * *